United States Patent [19]

Iwamura et al.

[11] Patent Number: 5,303,060
[45] Date of Patent: Apr. 12, 1994

[54] APPARATUS FOR RECORDING AND/OR REPRODUCING HDTV SIGNALS

[75] Inventors: Hiroshi Iwamura; Takehiko Shioda, both of Tokyo, Japan

[73] Assignee: Pioneer Electronic Corporation, Tokyo, Japan

[21] Appl. No.: 25,345

[22] Filed: Mar. 3, 1993

[30] Foreign Application Priority Data

Apr. 13, 1992 [JP] Japan .................................. 4-92701

[51] Int. Cl.⁵ .................................................. H04N 9/79
[52] U.S. Cl. ..................................... 358/310; 348/491; 348/441; 348/390
[58] Field of Search ................... 358/310, 11, 12, 13, 358/14, 140, 133, 138; H04N 9/79, 9/80

[56] References Cited

U.S. PATENT DOCUMENTS

| | | | |
|---|---|---|---|
| 4,866,519 | 9/1989 | Lucas et al. | 358/140 |
| 5,031,040 | 7/1991 | Maruyama | 358/11 |
| 5,072,296 | 12/1991 | Lim | 358/12 |
| 5,159,460 | 10/1992 | Senso | 358/310 |

FOREIGN PATENT DOCUMENTS 0417609  3/1991  European Pat. Off. .

Primary Examiner—Tommy P. Chin
Assistant Examiner—Khoi Truong
Attorney, Agent, or Firm—Sughrue, Mion, Zinn, Macpeak & Seas

[57] ABSTRACT

An HDTV signal (dot density: 2N dots/line) is converted into a luminance signal and a line sequential color signal, and the resulting signals are both subjected to vertical interpolation and vertical filtering to derive a sequential scanning luminance signal and a sequential scanning color signal. The resulting sequential scanning luminance signal and sequential scanning color signal are subjected to frame thinning to reduce the frequency thereof to a half. Then, subsampling is performed to reduce the dot density to N dots/line. Next, dot rearranging for distributing adjacent dots to adjacent lines is performed to double the number of frames, whereby the dot density of each frame is reduced to N/2 dots/line. These consequently derived frames are encoded for recording. In this manner, the frequency bandwidth required to a recording medium for recording HDTV signals can be reduced.

4 Claims, 16 Drawing Sheets

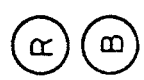

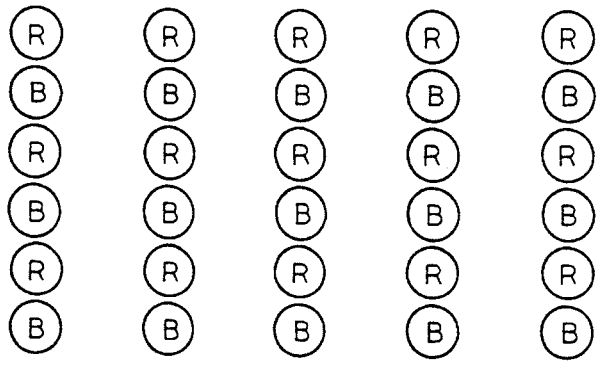

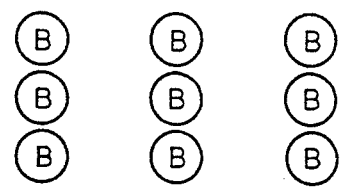

FIG.16(a)
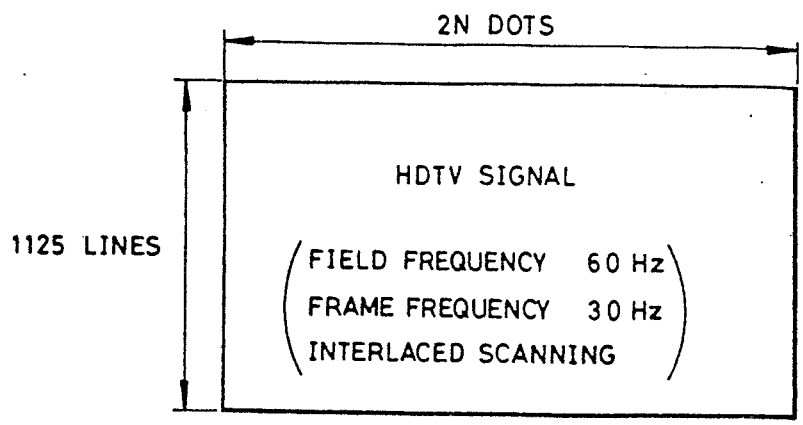
FIG.16(b)
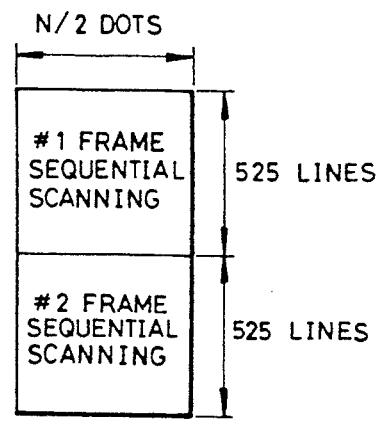
FIG.16(c)      FIG.16(d)
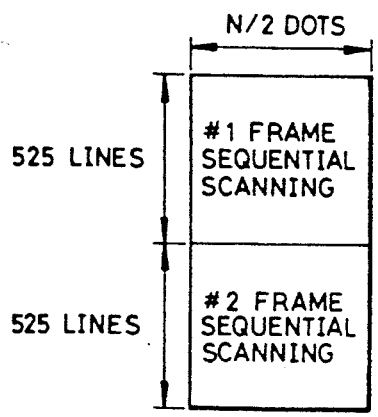
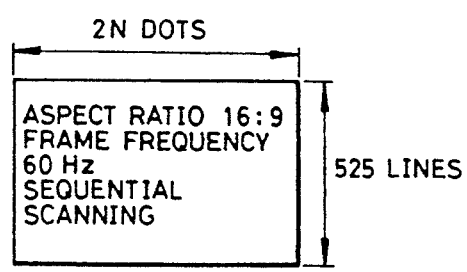

APPARATUS FOR RECORDING AND/OR REPRODUCING HDTV SIGNALS

FIELD OF THE INVENTION

The present invention relates to an apparatus for recording and/or reproducing three primary color HDTV (High Definition Television) signals as a single compound signal.

BACKGROUND OF THE INVENTION

Three primary color video signals produced by three television cameras are standard television signals and are the so-called interlaced signals. When such those three primary color video signals are produced in the HDTV system each of them has 1125 number of scanning lines per frame and a transmission bandwidth of the luminance signal thereof extending over 20 MHz which is about four times as much as that of the NTSC system being 4.5 MHz. It is therefore necessary to perform bandwidth compression in order to transmit such HDTV signals through conventional TV transmission lines. One of systems for achieving this is known as the so-called MUSE (Multiple Sub-Nyquist Sampling Encoding) system.

On the other hand, for recording and reproducing HDTV video signals using a recording medium, the bandwidth compression or data compression is required also for utilizing existing recording apparatus. The present assignee has proposed an HDTV signal recording-/reproducing system in Japanese Patent Application No. 2-169841.

A recording/reproducing system of this earlier application, as shown in FIG. 1(a), converts interlaced HDTV signals each having 1125 scanning lines, a number of horizontal pixels equal to N (N is an integer, for example, N=960), and a field frequency at 60 Hz into sequential (non-interlaced) scanning video signals each having 525 scanning lines, a number of horizontal pixels equal to N/2, and a frame frequency at 60 Hz for recording. Then, as shown in FIG. 1(b), the thus recorded signal is reproduced as sequential scanning video signals having 525 scanning lines, the number of horizontal pixels being N dots, the frame frequency at 60 Hz, and an aspect ratio equal to 16:9. In this manner, a current NTSC recording apparatus and a medium can be utilized to record/reproduce video signals with high image quality.

It should be noted that when a movie film is used as a video source, the number of horizontal pixels may be increased to 2N dots/line (N=960) since the resolution of the film is sufficiently high.

SUMMARY OF THE INVENTION

It is a first object of the present invention to provide an HDTV signal recording/reproducing apparatus which is capable of recording and reproducing HDTV signals with high resolution as described above.

It is a second object of the present invention to provide an HDTV signal recording/reproducing apparatus which is capable of recording and reproducing highly accurate HDTV signals utilizing a recording medium for NTSC formatted signals.

It is a third object of the present invention to provide an HDTV signal recording/reproducing apparatus which is capable of recording and reproducing HDTV signals with high resolution by signal processing means of a relatively simple circuit configuration.

An HDTV signal recording/reproducing apparatus according to the present invention comprises:

A/D converting means for digitizing inputted three primary HDTV signals;

Y/C converting means for converting the digitized HDTV signals into a luminance signal and two color signals;

line sequential means for thinning pixels of the respective color signals to generate a single line sequential color signal;

signal format converting means for producing a sequential scanning luminance signal and a sequential scanning color signal by thinning every other horizontal line from each of the luminance signal and the line sequential color signal after being vertically interpolated;

frame frequency reducing means for thinning every other frame from each of the sequential scanning luminance signal and the sequential scanning color signal;

pixel number reducing means for performing two-dimensional subsampling for the sequential scanning luminance signal outputted from the frame frequency reducing means to reduce the number of horizontal pixels thereof to a half, and for thinning pixels on every line of the sequential scanning color signal for converting the same into a line sequential signal and performing two-dimensional subsampling for the line sequential color signal to reduce the number of horizontal pixels thereof to a quarter;

rearranging means for distributing dots on each line of the luminance signal and the color signal outputted from the pixel number reducing means to two lines to rearrange one scanning line to two scanning lines each having a half of the number of pixels of a line;

a TCI encoder for dividing each of the luminance signal and the color signal outputted from the rearranging means into two frames, and outputting a TCI signal which is produced by time-base compressing and time-division multiplexing each of the frames divided from the luminance signal and the color signal; and D/A converting and recording means for converting the TCI signal outputted from the TCI encoder into an analog signal and thereafter recording the analog signal onto a recording medium.

BRIEF DESCRIPTION OF THE DRAWINGS

FIGS. 8(a) through 8(e) are diagrams used for explaining the operation of a thinning/line sequential circuit in FIG. 2;

FIGS. 16(a) through 16(d) are diagrams used for explaining signal formats for signals which are transmitted by the recording/reproducing apparatus according to the present invention.

PREFERRED EMBODIMENTS OF THE INVENTION

Figure 1A:
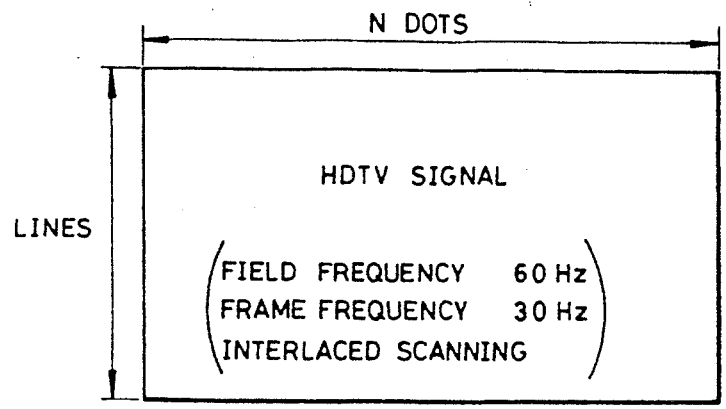
FIGS. 1(a) through 1(d) are diagrams respectively showing a signal format in the HDTV signal recording/reproducing system, disclosed in the earlier application.
Figure 1B:
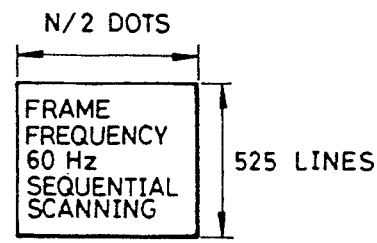
Figure 1C:
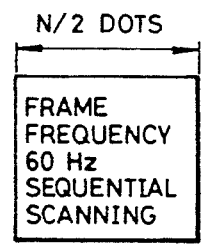
Figure 1D:
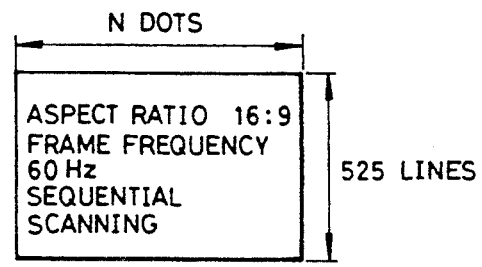
Figure 2:
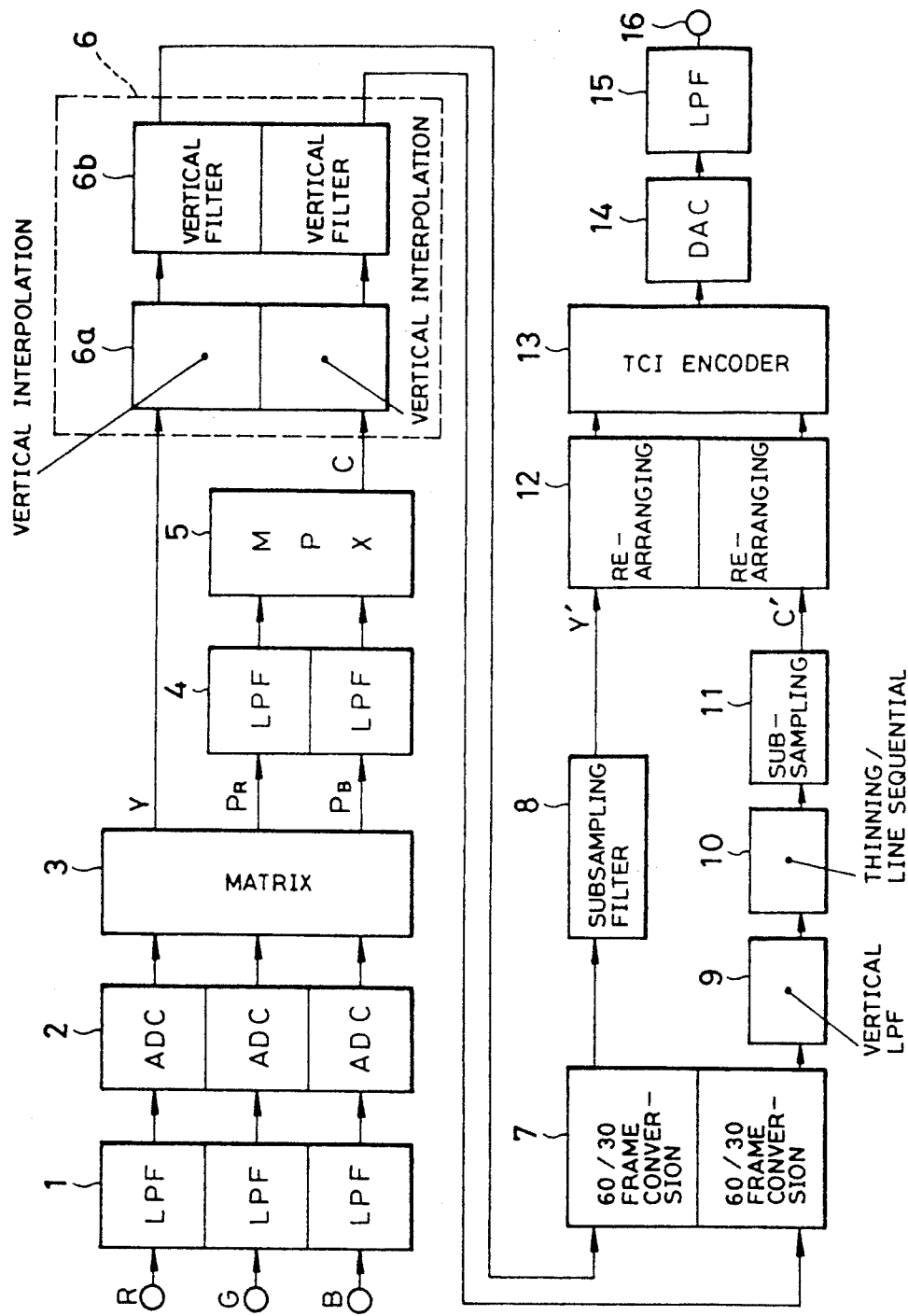
FIG. 2 is a block diagram showing an embodiment of a three primary color HDTV signal recording apparatus according to the present invention.

Referring to FIG. 2, component signals of the RGB HDTV signals are limited in bandwidth by low pass filters (LPF) 1, and then converted into a digital signal by analog-to-digital convertors (ADC) 2. These converted digital RGB signals each comprising a number of horizontal pixels equal to 2N dots (for example, 1920 dots) are converted by a matrix circuit 3 into a luminance signal Y and two color difference signals $P_R$, $P_B$. The two separated color difference signals $P_R$, $P_B$ are subjected to bandwidth limitation by low pass filters (LPF) 4, and are then dot-multiplexed for each line by a multiplexer (MPX) circuit 5 to be converted into a color signal C.

The luminance signal Y and the color signal C derived as described above are supplied to a signal format converting circuit 6 comprising a vertical interpolating circuit 6a and a vertical filter 6b, wherein the interlaced scanning signal having 1125 scanning lines and 2N dots of horizontal pixels into a sequential scanning signal having 525 scanning lines and 2N dots of horizontal pixels.

Figure 3:
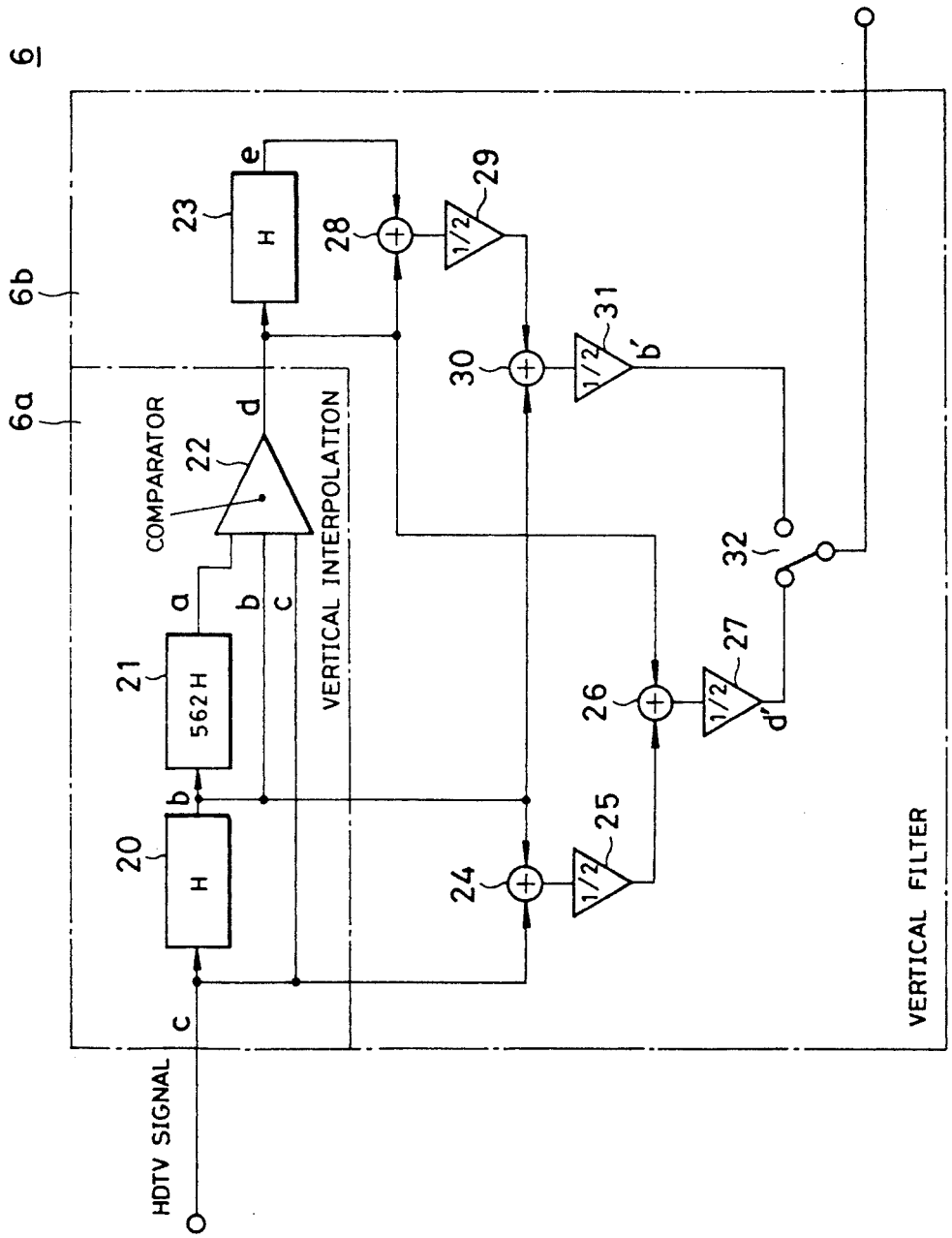
FIG. 3 is a block diagram showing a format converting circuit in FIG. 2.

FIG. 3 is a block diagram showing the configuration of the signal format converting circuit 6. The vertical interpolating circuit 6a interpolates scanning lines of HDTV signals, which are interlaced scanning signals, to convert the same into a sequential scanning signal. A line memory 20 stores one line portion of scanning line signals of the HDTV signal. A field memory 21, coupled to the output of the line memory 20, stores one field portion of scanning line signals. A comparator 22 is supplied with the output a of the field memory 21, the output b of the line memory 20, and an inputted HDTV signal c.

The comparator circuit 22 comprises a three-point median filter which outputs a median value out of contrast values of pixels in a local region which are placed in the order of the contrast value. It should be noted that the use of this median filter is advantageous in that it eliminates blurring at the edge of a picture and is resistant to noise, as compared with a local averaging circuit.

The vertical filter 6b performs a thinning operation line by line for the video signal having 1125 scanning lines converted into a sequential scanning signal by the vertical interpolating circuit 6a, and thereafter removes every other line of the sequential scanning signal having 1125 scanning line to convert the same into a video signal having 525 scanning lines. The vertical filter 6b comprises a line memory 23 coupled to the output of the comparator circuit 22 for storing one line portion of scanning line signals; an adder 24 for adding an input c and output b of the line memory 20; a multiplier 25 for multiplying the addition value from the adder 24 by ½; an adder 26 for adding the output of the adder 25 to the output of the comparator 22; a multiplier 27 for multiplying the addition value from the adder 25 by ½; an adder 28 for adding the input d and the output e of the line memory 23; a multiplier 29 for multiplying the addition value from the adder 28 by ½; an adder 30 for adding the output b of the line memory 20 to the output of the multiplier 29; a multiplier 31 for multiplying the addition value from the adder 30 by ½; and a switch circuit 32 for switching the output of the multiplier 27 and the output of the multiplier 31 for every field.

Figure 4:
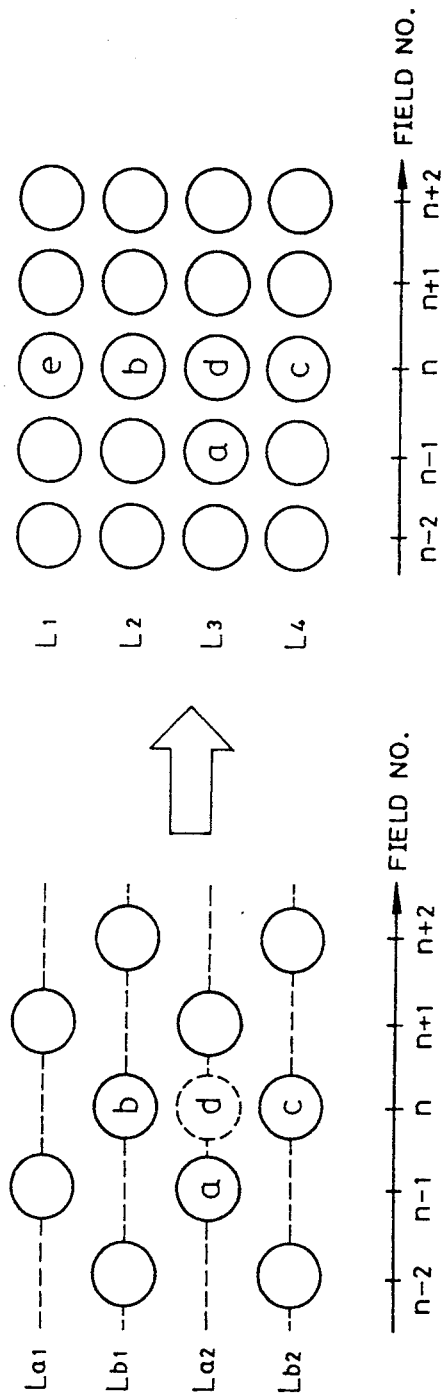
FIGS. 4(a) and 4(b) are diagrams used for explaining the operation of a vertical interpolating circuit in FIG. 2.

Suppose now that a pixel d is interpolated into a line $La_2$ of the first field by the vertical interpolating circuit 6a, as shown in FIG. 4(a). When a pixel c on a line $Lb_2$ of the second field is inputted to the line memory 20, a pixel having a median value is selected by the comparator 22 from the inputted pixel c, a pixel b on a line $Lb_1$ outputted from the line memory 20, and a pixel on the line $La_2$ of the previous field outputted from the field memory 21, and this is outputted as an interpolated pixel d. By repeating this processing, a sequential scanning video signal having 1125 scanning lines is derived as shown in FIG. 4(b).

The thus derived sequential scanning signal having 1125 scanning lines is subjected to a thinning operation by the vertical filter 6b for every line. Defining pixels a~e on lines L1~L4, as shown in FIG. 4(b), at the time the pixel c is inputted to the line memory 20, the pixel b on the line L2 is outputted from the line memory 20, the pixel d is outputted from the comparator 22, and the pixel e is outputted from the line memory 23, respectively. If the switch circuit 32 is switched to the multiplier 27 in this state, a weighted sum of the pixels b, d, c, is taken, and a pixel d' is derived as expressed by the following equation:

$$d' = \tfrac{1}{4} \cdot d + \tfrac{1}{2} \cdot b + \tfrac{1}{4} \cdot c$$

If the switch circuit 32 has been switched to the multiplier 31 in this state, a weighted sum of the pixels b, d, e is calculated as shown by the following equation, and is outputted as a pixel b':

$$b' = \tfrac{1}{4} \cdot b + \tfrac{1}{2} \cdot d + \tfrac{1}{4} \cdot e$$

It should be noted that the switch circuit 32 is switched for every field.

Figure 5:
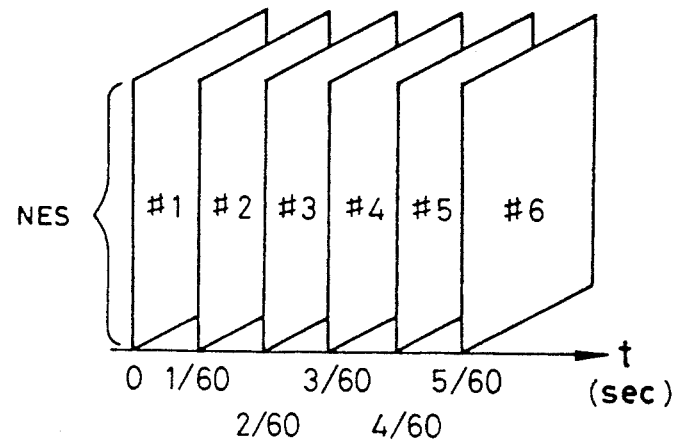
FIGS. 5(a) and 5(b) are diagrams used for explaining the operation of a 60/30 frame converting circuit in FIG. 2.
Figure 5:
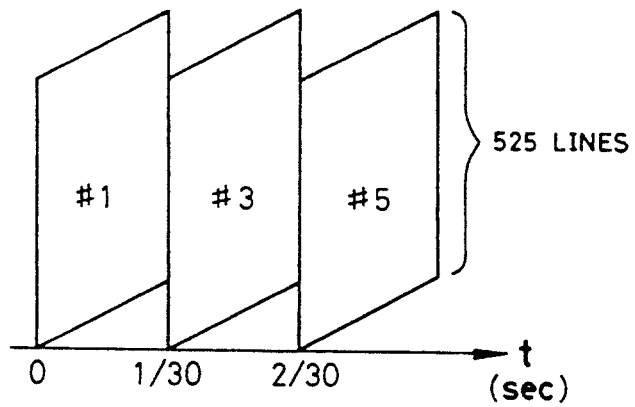

A video signal, as shown in FIG. 5(a), which has been converted by the signal format converting circuit 6 into a sequential scanning signal having 525 scanning lines and a frame frequency at 60 Hz as described above is thinned for every other frame by a 60/30 frame converting circuit 7 to be converted into a video signal having a frame frequency at 30 Hz, as shown in FIG. 5(b). A luminance signal Y and a color signal C outputted from this 60/30 frame converting circuit 7 each constitute a sequential scanning signal having 525 scanning lines, 2N dots of horizontal pixels, and a frame frequency at 30 Hz.

Within the luminance signal Y and the color signal C outputted from the 60/30 frame converting circuit 7, the luminance signal Y is supplied to a subsampling filter 8, wherein the amount of data on one line is reduced to a half, i.e., N dots. The color signal C is subjected to bandwidth limitation by a vertical low pass filter 9 and is then converted into a line sequential signal by a thinning/line sequential circuit 9, and thereafter the amount of data on one line (the number of horizontal pixels) is reduced to a quarter, i.e., N/2 dots.

Figure 6:
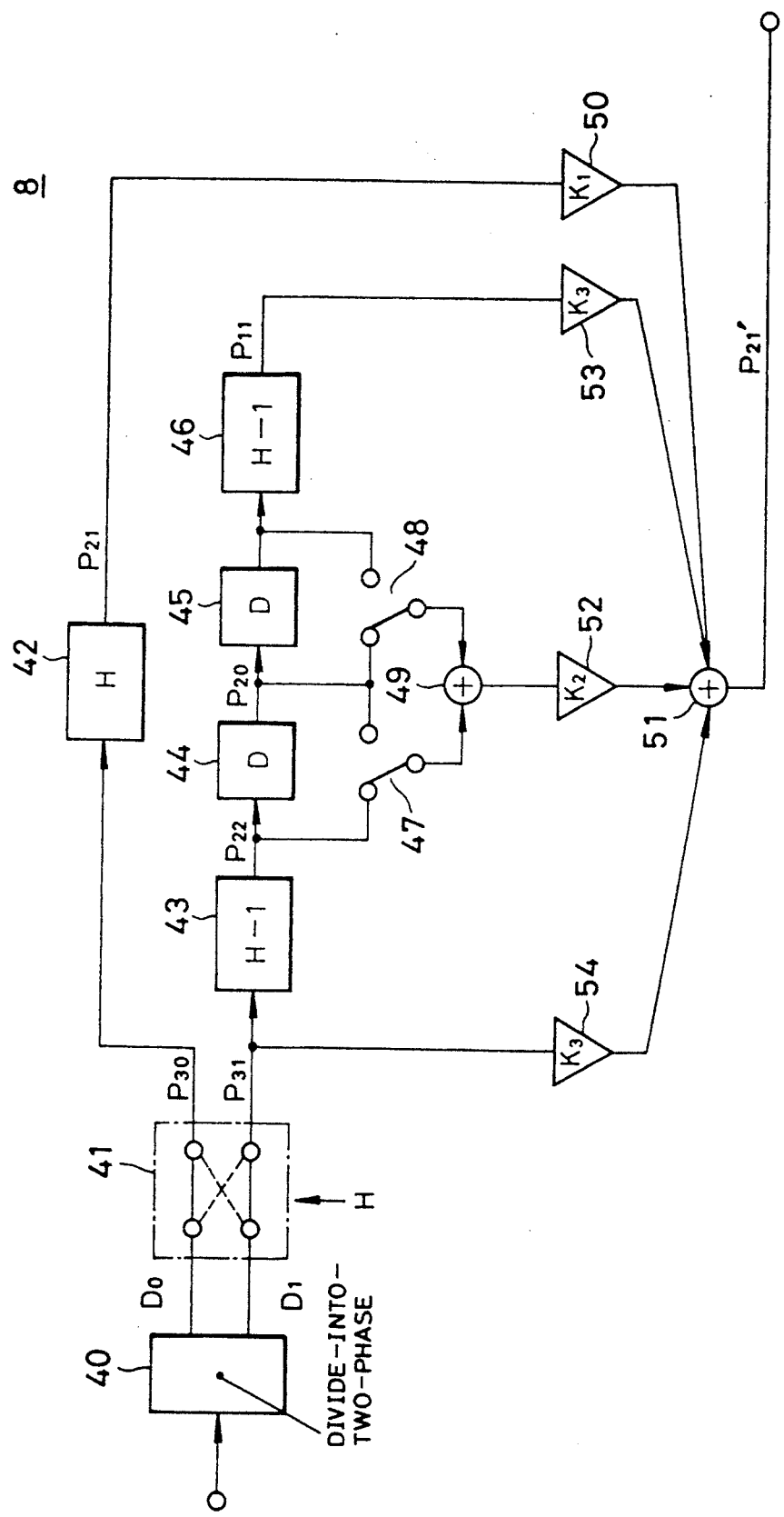
FIG. 6 is a block diagram showing a subsampling filter in FIG. 2.

FIG. 6 is a block diagram showing the configuration of the subsampling filter 8. As described above, the subsampling filter 8 subsamples the sequential scanning luminance signal outputted from the 60/30 frame converting circuit 7 by multiplying 3 lines×3 pixels of the luminance signal by coefficients in the form of 3×3 matrix, thus reducing the amount of data (number of horizontal pixels) to a half.

The subsampling filter 8 comprises a divide-into-two-phase circuit 40 which separates alternate pixels on each line of the inputted sequential scanning signal having 525 scanning lines and 2N dots of horizontal pixels to time-division multiplex the sequential scanning signal into two-phase data. The divided two-phase data are line by line switched by a switch circuit 41. One output of the switch circuit 41 is inputted to a line memory 42 for storing one line portion of scanning line signals, while the other output is inputted to a line memory 43 which stores scanning line signals of an amount equal to "one line minus one pixel." The output of the line memory 43 is inputted to a second line memory 46 for storing scanning line signals of an amount equal to "one line minus one pixel" through first and second delay circuits 44, 45 each for storing one pixel portion of scanning line signals. The input and output of the delay circuit 44 are alternately outputted by a switch circuit 47 which switches them for every line. Likewise, the input and output of the delay circuit 45 are alternately outputted by a switch circuit 48 which switches them for every line. The outputs of the switch circuits 47 and 48 are added to each other by an adder 49.

The output of the line memory 42 is multiplied by a coefficient $K_1$ by a multiplier 50 and then supplied to an adder 51. This adder 51 is also supplied with the output 50 of the adder 49 after being multiplied by a coefficient $K_2$ by a multiplier 51, the output of the multiplier 52 after being multiplied with a coefficient $K_3$ by a multiplier 53, and the input to the line memory 43 after being multiplied with a coefficient $K_3$ by a multiplier 54.

In this configuration, when the sequential scanning signals having 525 scanning lines, 2N dots of horizontal pixels and a frame frequency at 30 Hz are inputted from the 60/30 frame converting circuit 7 as lines $L_1$ (pixels $P_{10}$, $P_{11}$, ...), $L_2$ (pixels $P_{20}$, $P_{21}$, ...), $L_3$ (pixels $P_{30}$, $P_{31}$, ...), ..., the divide-into-two-phase circuit 40 fetches pixels on each line at a frequency of 2fs, separates every other pixel on every line, and outputs separated pixels as two-phase data at a frequency of fs.

Figure 7A:
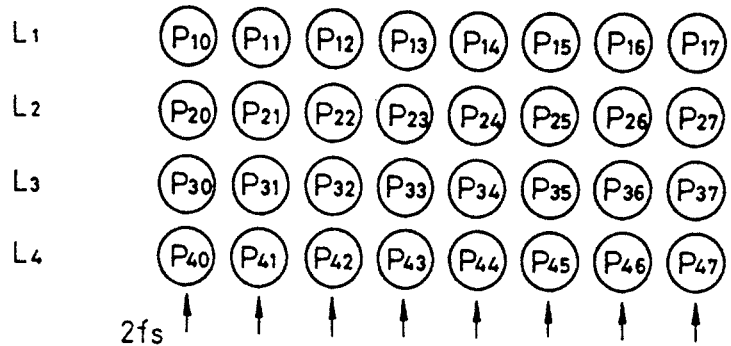
FIGS. 7(a) through 7(d) are diagrams used for explaining the operation of a sample filter in FIG. 6.
Figure 7B:
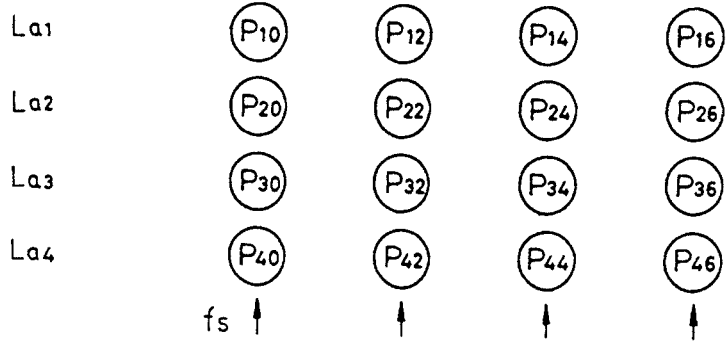
Figure 7C:
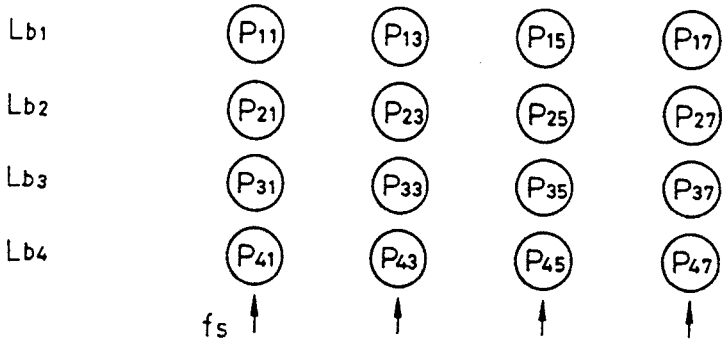

Therefore, the divide-into-two-phase circuit 40 outputs, as shown in FIG. 7(a), lines $L_{a1}$ (pixels $P_{10}$, $P_{12}$, ...), $L_{a2}$ (pixels $P_{20}$, $P_{22}$, ...), $L_{a3}$ (pixels $P_{30}$, $P_{32}$), ..., as an output signal $D_0$, and lines $L_{b1}$ (pixels $P_{11}$, $P_{13}$, ...), $L_{b2}$ (pixels $P_{21}$, $P_{23}$, ...), $L_{b3}$ (pixels $P_{31}$, $P_{33}$, ...) as an output signal D. These output signals $D_0$ and $D_1$ are alternately switched by the switch circuit 41 for every line, whereby the line memory 42 is supplied with lines $L_{a1} \rightarrow L_{b2} \rightarrow L_{a3} \rightarrow L_{b4} \rightarrow \ldots$, while the line memory 43 is supplied with lines $L_{b1} \rightarrow L_{ab} \rightarrow L_{b3} \rightarrow L_{a4} \rightarrow \ldots$ Supposing now that a pixel $P_{30}$ is outputted from the switch circuit 41 to the line memory 42, while a pixel $P_{31}$ is simultaneously outputted to the line memory 43, the pixel $P_{21}$ is outputted from the line memory 42; a pixel $P_{22}$ is outputted from the line memory 43; a pixel $P_{20}$ is outputted from the delay circuit 44; and a pixel $P_{11}$ is outputted from the line memory 46. Since the switch circuits 47 and 48 are maintained in the states shown in the drawing, a pixel $P_{21}'$ after subsampling is calculated as shown by the following equation and outputted from the adder 51:

$$P_{21}' = K_1 P_{21} + K_2(P_{20} + P_{22}) + K_3(P_{11} + P_{31})$$

Figure 7D:
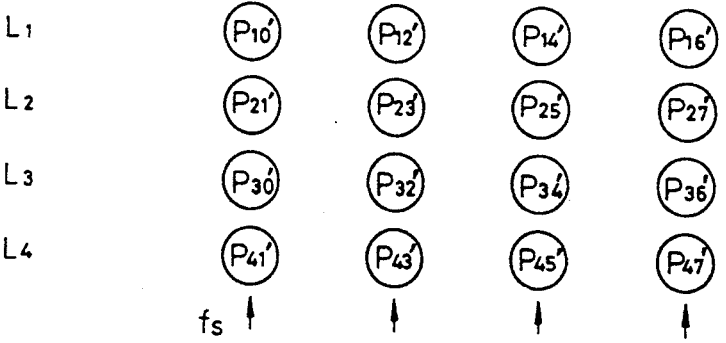
Figure 9A:
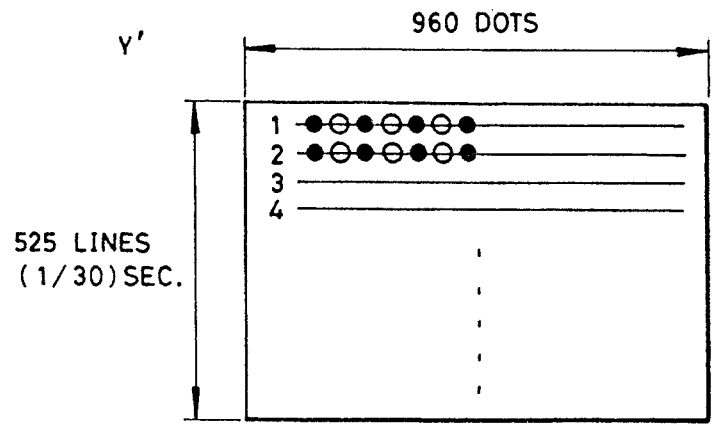
FIGS. 9(a) and 9(b) are diagrams used for explaining the operation of a rearranging circuit in FIG. 2.

In this manner, every other pixel is thinned from each line as shown in FIG. 7(d), and remaining pixels aligned in the vertical direction constitute, as shown in FIG. 9(a) a luminance signal Y, having 525 scanning lines, N dots of horizontal pixels, a frame frequency at 30 Hz which is afterward supplied to a rearranging circuit 12.

On the other hand, the color signal C outputted from the signal format converting circuit 6, which is dot-multiplexed for every line, as shown in FIG. 8(a), is subjected to band limitation by the vertical low pass filter 9, then thinned by a thinning/line sequential circuit 10 so as to be a line sequential color signal as shown in FIG. 8(b), further shifted to be aligned in the vertical direction as shown in FIG. 8(c), and finally supplied to a subsampling filter 11.

In the subsampling filter 11, aliasing distortion is previously removed. Then, every other pixel is thinned on every line as shown in FIG. 8(d), and remaining pixels are shifted in the vertical direction for alignment, as shown in FIG. 8(e). The resulting pixels constitute a color signal C' having 525 scanning lines, N/2 dots of horizontal pixels, and a frame frequency at 30 Hz, as shown in FIG. 9(a), which is supplied to the rearranging circuit 12.

Figure 9B:
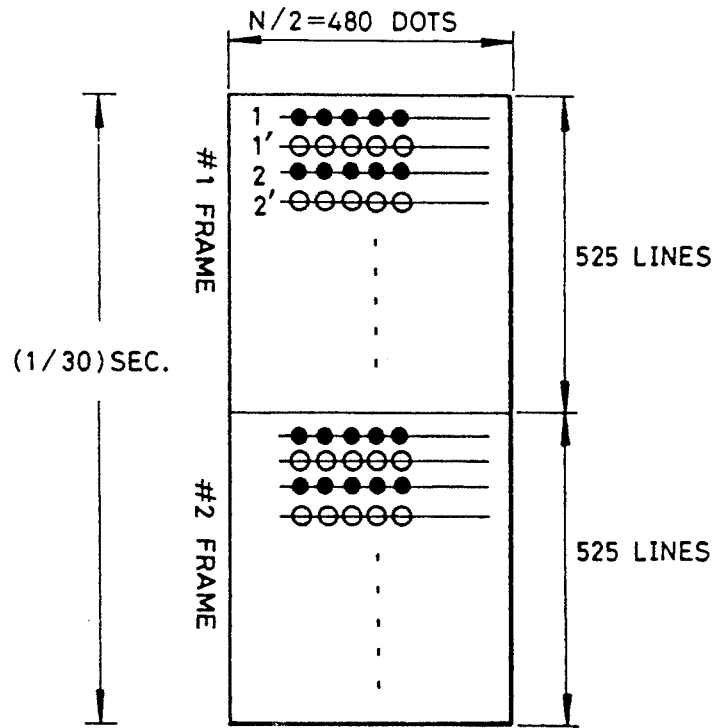

The rearranging circuit 12 rearranges the luminance signal Y' shown in FIG. 9(a) and outputs two frame images each having 525 scanning lines and N/2 dots of horizontal pixels, as shown in FIG. 9(b). It is in this instance to be understood that each frame of the color signal C' is divided into two frames of 525 scanning lines and N/4 dots of horizontal pixels.

More specifically, the rearranging circuit 12 classifies pixels on each line into odd-numbered pixels (represented by black circles) and even-numbered pixels (represented by white circles) as shown in FIG. 9(a), and distributes them to two separate lines, thereby rearranging horizontal scanning lines 1, 2, 3, ... each comprising 960 dots as shown in FIG. 9(a) to double horizontal scanning lines 1, 1', 2, 2', 3, 3', ... as shown in FIG. 9(b), thus dividing the original signal into two frame images each having 525 scanning lines and N/2 dots of horizontal pixels. The frame images designated #1 and #2 derived by this rearranging, as a whole, have a frame frequency at 30 Hz, so that they can be outputted as a video signal having a frame frequency at 60 Hz by reading out each frame image at a double frequency of 60 Hz.

In the above described manner, each of the luminance signal Y' and the color signal C', rearranged into two frame images, is time-base compressed and time-division multiplexed in a TCI encoder 13 for every frame image and outputted as a TCI signal having a frame frequency at 60 Hz. This TCI signal, after being converted into an analog signal by a digital-to-analog convertor (DAC) 14 and bandwidth limited by a low pass filter 15, is outputted through an output terminal 16 and recorded onto a recording medium such as a laser disk or a video tape by an optical disk recording circuit or a magnetic tape recording circuit, not shown.

Incidentally, although the rearranging circuit 12 rearranges odd-numbered pixels (black circles) and even-numbered pixels (white circles) as two vertically adjacent scanning lines as shown in FIGS. 9(a) and 9(b), the rearranging manner is not limited to this. For example, as shown in FIGS. 10(a) and 10(b), odd-numbered pixels (black circles) may only be used to create one frame, while even-numbered pixels (white circles) may only be used to create another frame.

Figure 10:
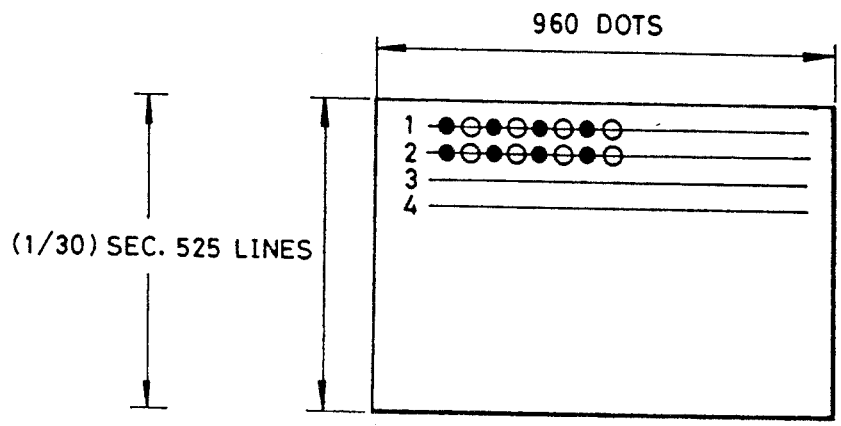
FIGS. 10(a) and 10(b) are diagrams used for explaining the operation of another rearranging circuit.
Figure 10:
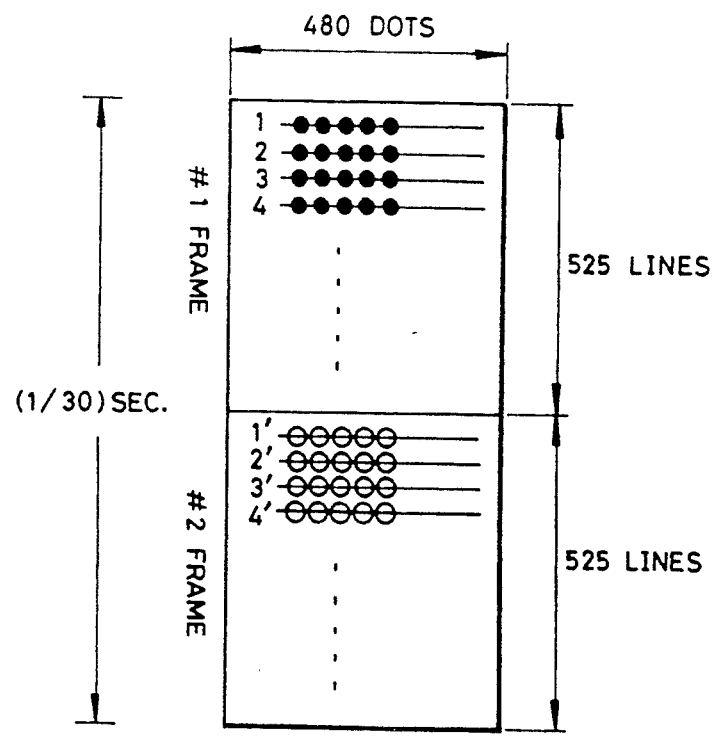

As shown in FIGS. 9 and 10, the conversion of one scanning line into two scanning lines by the distribution of pixels to the one scanning line is excellent as compared with a method which cuts an image into left and right segments in an intermediate portion of the image for rearranging. This is because the former method can prevent noise or the like from occurring during reproduction due to a boundary of the image in the intermediate portion.

Figure 11:
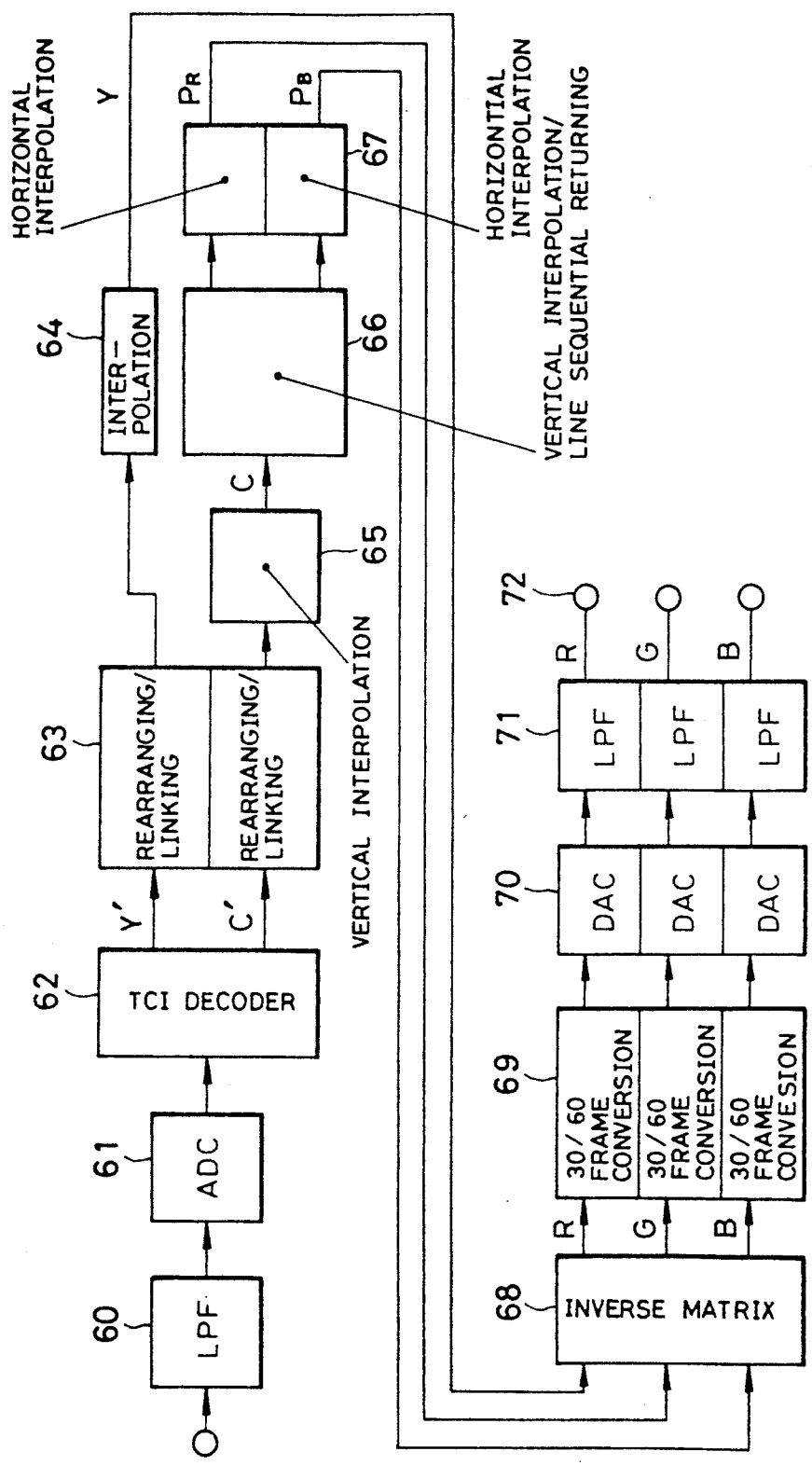
FIG. 11 is a block diagram showing an embodiment of a three primary color HDTV signal reproducing apparatus according to the present invention.

FIG. 11 shows an embodiment of a reproducing apparatus which reads and reproduces a video signal recorded according to the present invention. A video signal recorded on a recording medium such as a laser disk, a video tape or the like as described above, after being read by an optical disk playing apparatus or a magnetic tape playing apparatus, not shown, and bandwidth limited by a low pass filter (LPF) 60, is converted into a digital signal which is inputted to a TCI decoder 62.

The TCI decoder 62 separates a luminance signal and a color signal which are time-division multiplexed for every line, time-base expands the separated signals, and then outputs them. The time-base expanded luminance signal and color signal are respectively inputted to a rearranging and linking circuit 63. The rearranging and linking circuit 63 rearranges and links two frame images #1 and #2 each having 525 scanning lines, 480 dots of horizontal pixels, and a frame frequency of 60 Hz as shown in FIGS. 9(b) and 10(b) to recover a video signal having 525 scanning lines, N dots of horizontal pixels, and a frame frequency at 30 Hz as shown in FIG. 9(a).

A luminance signal outputted from the rearranging and linking circuit 63 is supplied to an interpolating circuit 64, wherein data thinned by the subsampling upon recording is interpolated.

Figure 12:
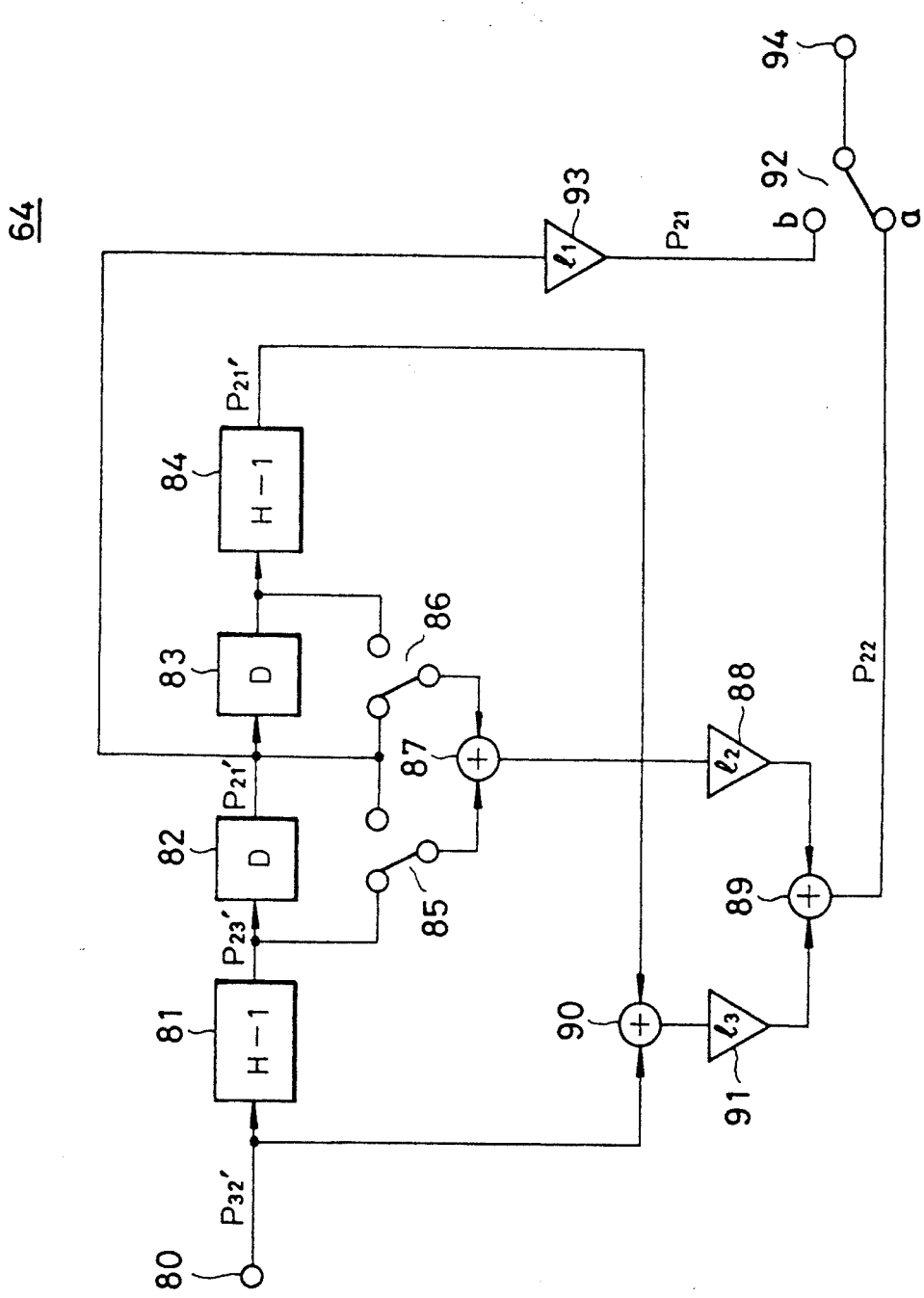
FIG. 12 is a block diagram showing an interpolating circuit in FIG. 11.

FIG. 12 is a block diagram showing the interpolating circuit 64. This interpolating circuit 64 multiplies 3 lines×3 pixels of a luminance signal outputted from the rearranging and linking circuit 63, as shown in FIG. 9(a) by coefficients in the form of a matrix to recover pixels thinned by the subsampling upon recording. A luminance signal inputted to an input terminal 80 is supplied to a line memory 81 for storing a "one line minus one pixel" portion of scanning line signals, the output of which is supplied through first and second delay circuits 82, 83 to a second line memory 84 for storing a "one line minus one pixel" portion of scanning line signals.

The input and output of the delay circuit 82 are alternately outputted by a switch circuit 85 which performs switching for every line, while the input and output of the delay circuit 83 are alternately outputted by a like switch circuit 86 which also performs switching for every line.

The outputs of he switch circuits 85 and 86 are added by an adder 87, and the addition value, after being multiplied by a coefficient $l_2$ by a multiplier 88, is supplied to an adder 89. Also, the input of the line memory 81 and the output of the line memory 84 are added by an adder 90, the addition value of which is multiplied by a coefficient $l_3$ by a multiplier 91 and also supplied to the adder 89. The output of the adder 89 is coupled to a movable terminal a of a switch circuit 92. Another movable terminal b of the switch circuit 92 is coupled to the output of the delay circuit 82 after being multiplied by a coefficient $l_1$ by a multiplier 93.

In this configuration, the input terminal 80 is supplied with a sequential scanning luminance signal from the rearranging and linking circuit 63, which has 525 scanning lines, 960 dots of horizontal pixels and a frame frequency at 30 Hz, as lines $L_1$ ($P_{10}'$, $P_{12}'$, ...), $L_2$ ($P_{21}'$, $P_{23}'$, ...), $L_3$ ($P_{30}'$, $P_{32}'$, ...), ...

When the pixel $P_{32}'$ of the line $L_3$ is supplied from the input terminal 80 to the line memory 81, the pixel $P_{23}'$ is outputted from the line memory 81, the pixel $P_{21}'$ is outputted from the delay circuit 82, and the pixel $P_{12}'$ is outputted from the line memory 84. Supposing that the switch circuits 85 and 86 remains in the shown states, a pixel $P_{22}$ from the adder 89 is calculated and interpolated as shown in the following equation:

$$P_{22} = l_2(P_{21}' + P_{23}') + l_3(P_{12}' + P_{32}')$$

p At the output of the multiplier 93, a pixel $P_{21}$ (=$l_1 P_{21}'$) is derived, so that this pixel $P_{21}$ is outputted by switching the switching circuit with a clock.

Figure 13A:
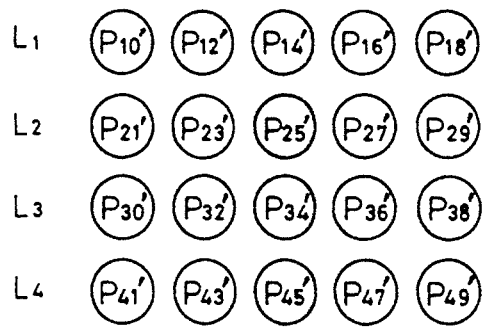
FIGS. 13(i a) and 13(b) are diagrams used for explaining the operation of the interpolating circuit.
Figure 13B:
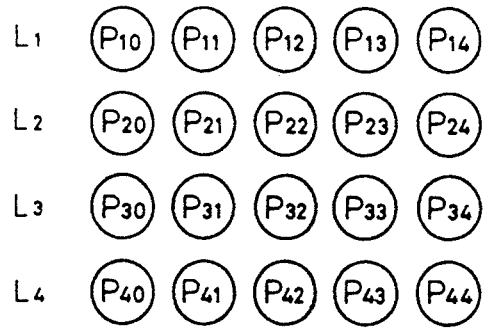

By repeating this operation, pixels thinned by the subsampling upon recording are interpolated as shown in FIG. 13(b), thereby recovering a sequential scanning luminance signal Y which has 525 scanning lines, 2N dots of horizontal pixels, and a frame frequency at 30 Hz. Incidentally, the relationship between the coefficients $l_1$–$l_3$ in FIG. 12 and the coefficients $K_1$–$K_3$ in FIG. 6 is determined to satisfy $l_n = 2_k$.

Figure 14A:
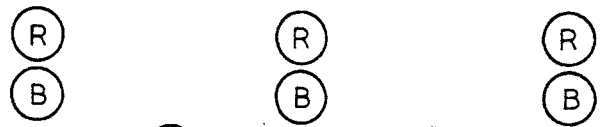
FIGS. 14(a) through 14(d) are diagrams used for explaining color signal interpolation.
Figure 14B:
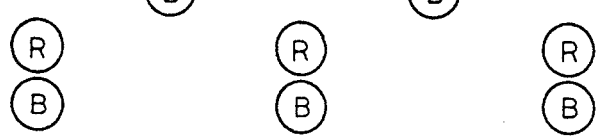
Figure 14C:

Referring back to FIG. 11, the line sequential luminance signal outputted from the rearranging and linking circuit 63, in turn, is supplied to a vertical interpolating circuit 65, wherein zero data is inserted as shown in FIG. 14(a), and pixels are interpolated in the vertical direction as shown in FIG. 14(b). The output of the vertical interpolating circuit 65 is supplied to a vertical interpolation and line sequential reconverting circuit 66, wherein it is reconverted to a line sequential signal as well as vertically interpolated, whereby two color difference signals are separated as shown in FIG. 14(c).

Figure 14D:
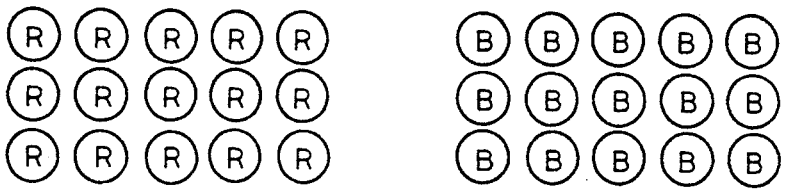

The two color difference signals outputted from the vertical interpolation and line sequential reconverting circuit 66 are each horizontally interpolated by a horizontal interpolating circuit 67 as shown in FIG. 14(d), thus recovering sequential scanning color difference signals $P_R$, $P_B$ each having 525 scanning lines, 2N dots of horizontal pixels, and a frame frequency of 30 Hz.

The thus recovered sequential scanning luminance signal Y and color difference signals $P_R$, $P_B$ are converted by an inverse matrix circuit 68 into three primary color RGB signals which are supplied to 30/60 frame converting circuit 69.

Figure 15:
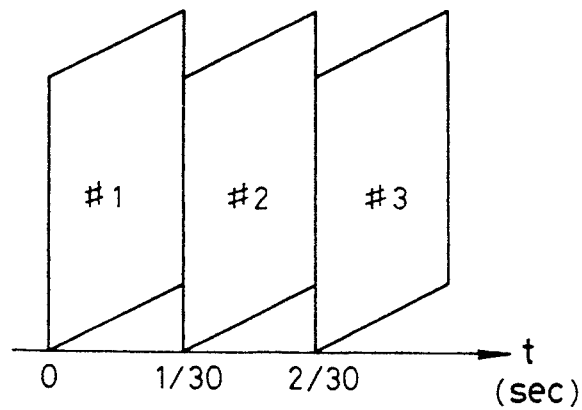
FIGS. 15(a) and 15(b) are diagrams used for explaining the operation of a 30/60 frame converting circuit in FIG. 11.
Figure 15:
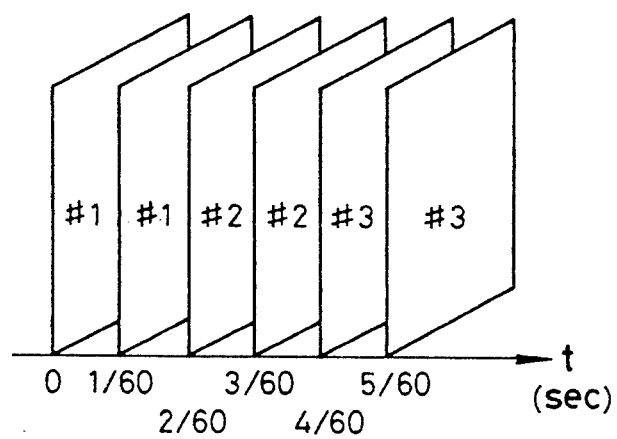

The 30/60 frame converting circuit 69 converts three primary color RGB signals at the frame frequency of 30 Hz to signals at the frame frequency of 60 Hz. The simplest method of carrying out the 30/60 frame conversion is that each video signal supplied at the frame frequency of 30 Hz as shown in FIG. 15(a) is repeatedly read twice at the frame frequency of 60 Hz and outputted. It should be noted that if a frame to be inserted in the middle is created by interpolating two sequential frames, it is possible to accomplish the 30/60 frame conversion with higher quality which reliably reproduces motions of an image.

The three primary color RGB signals, having the frames converted by the 30/60 frame converting circuit 69, are next converted into analog signal by a digital-to-analog convertor (DAC) 70, bandwidth limited by a low pass filter (LPF) 71, and then outputted from output terminals 72 as reproduced signals.

Thus, the video signals outputted from the respective output terminals 72 are presented as sequential scanning component RGB signals each having 525 scanning lines, an aspect ratio of 16:9 and a frame frequency at 60 Hz and supplied to a television receiver. Employment of a television receiver compatible with EDTV of a wide aspect ratio, for example, will result in reproducing high quality video signal having a double horizontal resolution compared with the system of the earlier application.

Incidentally, although the foregoing embodiment has been described for the case where a sequential scanning signal having 525 scanning lines and a frame frequency at 60 Hz is derived from an interlaced HDTV signal having 1125 scanning lines and a field frequency at 60 Hz, the present invention is not limited to this particular embodiment. Alternatively, such a signal may be derived from another video signal. Also, such a video source signal may be directly generated.

In summary, in the recording apparatus of the present invention, an input signal is a sequential scanning signal having 525 scanning lines and a frame frequency at 60 Hz, and such a signal may be derived, for example, from an interlaced HDTV signal having 1125 scanning lines and a field frequency at 60 Hz (FIG. 16(a)).

The sequential scanning signals having 525 scanning lines and a frame frequency at 60 Hz have their frame frequency converted from 60 Hz to 30 Hz by a 60/30 frame converting circuit. In the frame converted sequential scanning signals, a luminance signal is processed by a two-dimensional subsampling filter to decrease the number of pixels thereof to a half. Also, in the frame converted sequential scanning signals, two color difference signals $P_R$, $P_B$ are alternately thinned on every line to create a line sequential color signal with alternate color difference signals $P_R$, $P_B$. The line sequential color signal is further processed by a two-dimensional subsampling filter to decrease the number of pixels thereof to a quarter.

The luminance signal and color signal thus derived become sequential scanning signals respectively having 525 scanning lines, a frame frequency at 30 Hz, and a number of horizontal pixels decreased to a half and a quarter respectively. Then, these luminance signal and color signal are processed by a rearranging means such that one scanning line is converted into two scanning lines by separating respective pixels on each line and rearranging the separated pixels to two lines. 525 scanning lines as one block is divided into two upper and lower frame images to convert each signal into sequential scanning signals respectively having a frame frequency at 30 Hz and a number of horizontal pixels decreased to ¼ and ⅛ (see FIG. 16(b)).

The rearranged luminance signal and color signal as described above are time-base compressed and time-division multiplexed for each line of each frame image by a TCI encoder to be converted into a TCI signal. This TCI signal is then outputted for each frame image at a frame frequency of 60 Hz and recorded on a recording medium. Additionally, the reproducing apparatus of the present invention can perform reproduction processing for a signal recorded in a format as shown in FIG. 16(c) to reproduce an HDTV signal with a high resolution of 2N dots per line as shown in FIG. 16(d).

As is apparent from the foregoing, since the present invention can record and reproduce video signals, the horizontal resolution of which presents a double accuracy, it is possible to record and reproduce higher quality video signals as compared with the system of the earlier application.

Further, since the present invention allows such video signals with a doubly accurate horizontal resolution to be recorded and reproduced using the same transmission format as the system of the earlier application, the recording/reproducing system of the present invention can be implemented only by adding a 60/30 frame converting means and a rearranging means in the recording section of the system of the earlier application as well as a 30/60 frame converting means and a rearranging and linking means in the reproducing section of the same. The remaining hardware portions of the earlier application system can be commonly used for the system of the present invention, so that a cost on the whole system can be largely reduced.

What is claimed is:

1. An HDTV video signal recording apparatus comprising:
   A/D converting means for digitizing inputted three primary HDTV color signals;
   Y/C converting means for converting the digitized HDTV color signals into a luminance signal and two color difference signals;
   line sequential means for thinning pixels of the respective ones of said color signals to generate a single line sequential color signal;
   signal format converting means for producing a sequential scanning luminance signal and a sequential scanning color signal by thinning every other horizontal line from each of said luminance signal and said line sequential color signal after being vertically interpolated;
   frame frequency reducing means for thinning every other frame from each of said sequential scanning luminance signal and said sequential scanning color signal;
   pixel number reducing means for performing two-dimensional subsampling for the sequential scanning luminance signal outputted from said frame frequency reducing means to reduce the number of horizontal pixels thereof to a half, and for thinning pixels on every line of the sequential scanning color signal for converting the same into a line sequential signal and performing two-dimensional subsampling for the line sequential color signal to reduce the number of horizontal pixels thereof to a quarter;

rearranging means for distributing dots on each line of the luminance signal and the color signal outputted from said pixel number reducing means to two lines to rearrange one scanning line to two scanning lines each having a half of the number of pixels of a line, thus dividing each of the luminance signal and the color signal from said pixel number reducing means into two frames;

a TCI encoder for time-base compressing and time-division multiplexing each of said frames divided from the luminance signal and the color signal from said rearranging means and outputting a resulting TCI signal; and D/A converting and recording means for converting the TCI signal outputted from said TCI encoder into an analog signal and thereafter recording the analog signal onto a recording medium.

2. An HDTV recording apparatus according to claim 1, wherein said rearranging means classifies pixels on each line of the input signals into odd-numbered pixels and even-numbered pixels, and generates two frame images by arranging an odd-numbered pixel line formed by the odd-numbered pixels and an even-numbered pixel line formed by the even-numbered pixels adjacent to each other.

3. An HDTV recording apparatus according to claim 1, wherein said rearranging means classifies pixels on each line of the input signals into odd-numbered pixels and even-numbered pixels, and generates one frame image only with odd-numbered pixel lines formed by the odd-numbered pixels and another frame image only with even-numbered pixel lines formed by the even-numbered pixels.

4. An HDTV signal reproducing apparatus comprising:

A/D converting means for digitizing a signal read from a recording medium to generate a TCI signal;

a TCI decoder for separating said TCI signal into a luminance signal and a color signal, and expanding the time-base thereof;

rearranging and linking means for converting the luminance signal and the color signal both having a frame frequency at 60 Hz, outputted from said TCI decoder, into a luminance signal and a color signal both having a frame frequency at 30 Hz by rearranging and recoupling scanning lines of two adjacent frame images;

interpolating means for recovering pixels by interpolation for each of the luminance signal and the color signal both outputted from said rearranging and linking means, as well as separating and outputting two color difference signals multiplexed in the color signal;

inverse matrix means for recovering three primary RGB signals from the luminance signal and the two color difference signals outputted from said interpolating means;

frame frequency doubling means for converting the three primary color RGB signals having a frame frequency at 30 Hz, outputted from said inverse matrix means, into three primary color RGB signals having a frame frequency at 60 Hz; and D/A converting means for converting each of the three primary color RGB signals outputted from said frame frequency doubling means into analog signals and outputting the analog signals.

* * * * *